United States Patent
Kim et al.

(10) Patent No.: US 10,848,239 B2
(45) Date of Patent: Nov. 24, 2020

(54) SYSTEM AND METHOD FOR BACKSCATTER-BASED COOPERATIVE COMMUNICATION IN WIRELESS-POWERED HETEROGENEOUS NETWORK

(71) Applicant: Research & Business Foundation Sungkyunkwan University, Suwon-si (KR)

(72) Inventors: Dong In Kim, Seongnam-si (KR); Sung Hoon Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 16/689,279

(22) Filed: Nov. 20, 2019

(65) Prior Publication Data
US 2020/0169318 A1   May 28, 2020

(30) Foreign Application Priority Data
Nov. 27, 2018   (KR) .................. 10-2018-0148677

(51) Int. Cl.
*H04B 7/22* (2006.01)
*H04B 17/309* (2015.01)
(Continued)

(52) U.S. Cl.
CPC ............... *H04B 7/22* (2013.01); *H02J 50/20* (2016.02); *H02J 50/80* (2016.02);
(Continued)

(58) Field of Classification Search
CPC .... H04B 7/22; H04B 7/15557; H04B 17/309; H04B 7/15592; H04B 1/10; H04B 1/12;
(Continued)

(56) References Cited

U.S. PATENT DOCUMENTS

| | | | | |
|---|---|---|---|---|
| 5,231,480 A | * | 7/1993 | Ulich .................. | G01S 17/89 348/31 |
| 7,215,976 B2 | * | 5/2007 | Brideglall ............ | G06K 7/0008 235/380 |

(Continued)

FOREIGN PATENT DOCUMENTS

KR   10-2017-0103059 A   9/2017
KR   10-2018-0024371 A   3/2018

OTHER PUBLICATIONS

Korean Office Action dated Sep. 27, 2019 in corresponding Korean Patent Application No. 10-2018-0148677 (4 pages in Korean).

*Primary Examiner* — Hai V Nguyen
(74) *Attorney, Agent, or Firm* — NSIP Law

(57) ABSTRACT

A system for backscatter-based cooperative communication in a wireless-powered heterogeneous network includes a low-power access point, a hybrid access point, and Internet of Things (IoT) devices. The low-power access point transmits an unmodulated carrier. The hybrid access point is in communication with a primary device using a signal. Internet of Things (IoT) devices harvest energy of the unmodulated carrier and the signal, and each of the IoT devices sequentially transmits information to the hybrid access point through a bistatic backscatter communication-based cooperation mode or non-cooperation mode using the harvested energy.

12 Claims, 5 Drawing Sheets

(51) Int. Cl.
*H02J 50/80* (2016.01)
*H02J 50/20* (2016.01)
*H04B 7/155* (2006.01)

(52) U.S. Cl.
CPC ..... *H04B 7/15557* (2013.01); *H04B 7/15592* (2013.01); *H04B 17/309* (2015.01)

(58) Field of Classification Search
CPC ......... H04B 1/40; H04B 7/0413; H02J 50/20; H02J 50/80; H04L 27/2649; H04K 3/25; H04K 2203/20; G06K 19/07773
USPC .......................................................... 455/15
See application file for complete search history.

(56) References Cited

U.S. PATENT DOCUMENTS

| | | | | |
|---|---|---|---|---|
| 8,797,550 | B2* | 8/2014 | Hays | G01P 5/26 356/519 |
| 8,810,796 | B2* | 8/2014 | Hays | G01S 17/58 356/450 |
| 8,866,322 | B2* | 10/2014 | Tchoryk, Jr. | G01S 17/89 290/44 |
| 9,086,488 | B2* | 7/2015 | Tchoryk, Jr. | G01S 17/95 |
| 9,312,950 | B1* | 4/2016 | Deyle | H04B 7/26 |
| 9,369,160 | B2* | 6/2016 | Barott | H04B 1/12 |
| 9,749,958 | B1* | 8/2017 | Segev | H04W 52/0235 |
| 9,754,139 | B2* | 9/2017 | Chemishkian | H02J 50/20 |
| 9,819,206 | B2* | 11/2017 | Keskin | H02J 7/0069 |
| 9,973,367 | B2* | 5/2018 | Gollakota | H04L 27/2649 |
| 10,382,161 | B2* | 8/2019 | Gollakota | H02J 11/00 |
| 10,383,126 | B2* | 8/2019 | Gollakota | H02J 50/20 |
| 10,395,162 | B1* | 8/2019 | Vougioukas | H04B 1/10 |
| 10,520,997 | B2* | 12/2019 | Sen | G06F 3/03543 |
| 2006/0083110 | A1* | 4/2006 | Tietjen | G01S 15/003 367/127 |
| 2008/0080414 | A1* | 4/2008 | Thubert | H04W 76/12 370/328 |
| 2011/0141470 | A1* | 6/2011 | Renard | G01P 5/26 356/342 |
| 2012/0050750 | A1* | 3/2012 | Hays | G01S 17/003 356/519 |
| 2012/0075072 | A1* | 3/2012 | Pappu | H04B 5/0062 340/10.1 |
| 2012/0169053 | A1* | 7/2012 | Tchoryk, Jr. | G01W 1/02 290/44 |
| 2012/0274937 | A1* | 11/2012 | Hays | G01S 17/58 356/337 |
| 2013/0201316 | A1* | 8/2013 | Binder | H04L 67/12 348/77 |
| 2013/0286959 | A1* | 10/2013 | Lou | H04L 5/0055 370/329 |
| 2013/0314694 | A1* | 11/2013 | Tchoryk, Jr. | G01N 21/45 356/28.5 |
| 2015/0091706 | A1* | 4/2015 | Chemishkian | H02J 50/20 340/10.34 |
| 2015/0311944 | A1* | 10/2015 | Gollakota | H04B 1/40 375/219 |
| 2015/0318881 | A1* | 11/2015 | Barott | H04B 1/12 375/285 |
| 2015/0381269 | A1* | 12/2015 | Deyle | H04B 7/22 455/41.2 |
| 2016/0085501 | A1* | 3/2016 | Denton | H04R 27/00 715/716 |
| 2016/0094933 | A1* | 3/2016 | Deyle | H04L 27/3455 375/262 |
| 2016/0365890 | A1* | 12/2016 | Reynolds | H04B 1/525 |
| 2017/0180075 | A1* | 6/2017 | Gollakota | H02J 50/001 |
| 2017/0180178 | A1* | 6/2017 | Gollakota | H04B 7/0413 |
| 2017/0273597 | A1* | 9/2017 | Schuelke | A61B 5/1495 |
| 2018/0183855 | A1* | 6/2018 | Sabella | G06F 9/505 |
| 2018/0205144 | A1* | 7/2018 | Huang | H02J 50/20 |
| 2018/0323656 | A1* | 11/2018 | Haas | H02J 50/20 |
| 2018/0323657 | A1* | 11/2018 | Hannigan | H02J 50/23 |
| 2018/0375440 | A1* | 12/2018 | Alvarez Valenzuela | H02M 7/483 |
| 2019/0064344 | A1* | 2/2019 | Turner | A61B 5/6898 |
| 2019/0258915 | A1* | 8/2019 | Vougioukas | H04B 1/10 |
| 2020/0107324 | A1* | 4/2020 | Kim | H04W 72/085 |
| 2020/0196171 | A1* | 6/2020 | Thangarasa | H04W 24/02 |

* cited by examiner

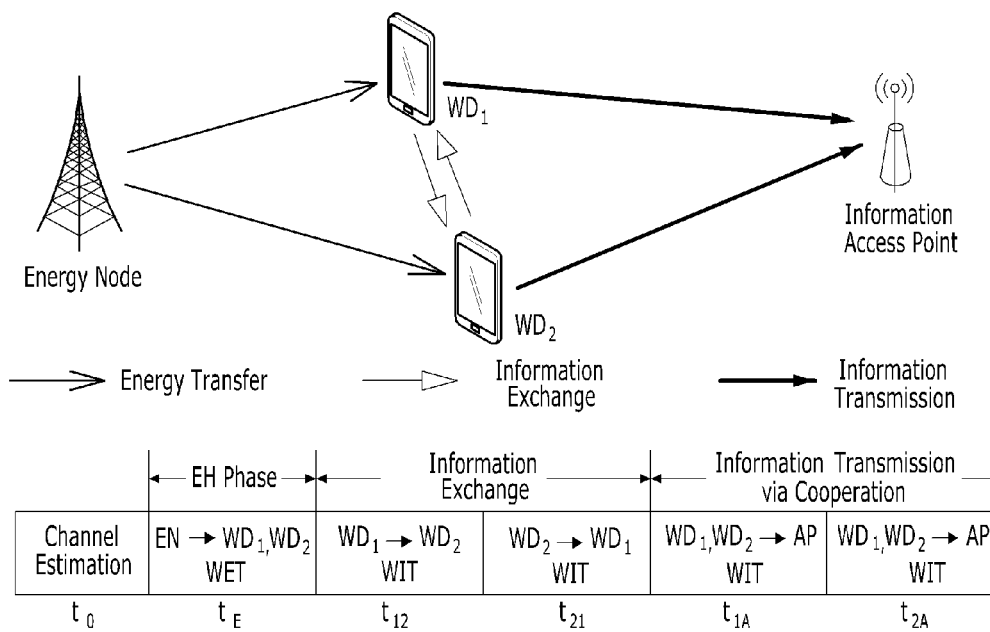
[FIG. 1]
-- Prior Art --

[FIG. 2]
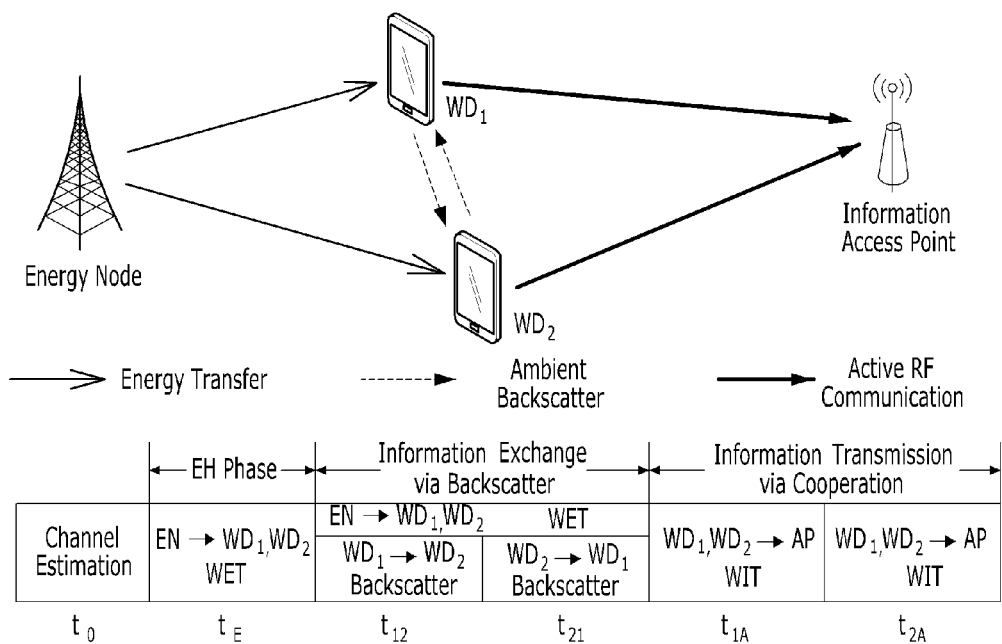
-- Prior Art --

[FIG. 3]
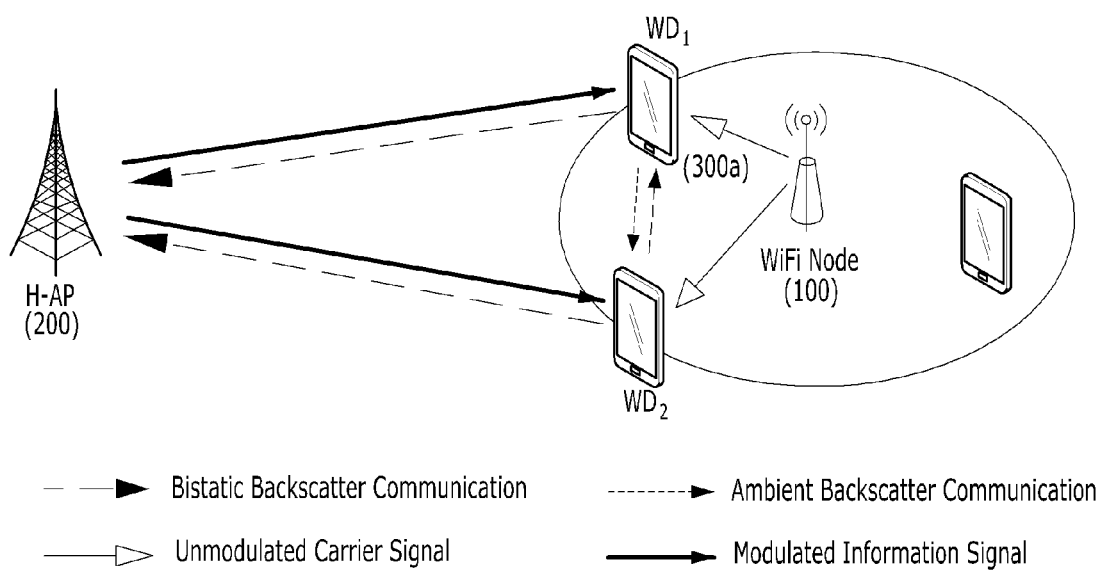

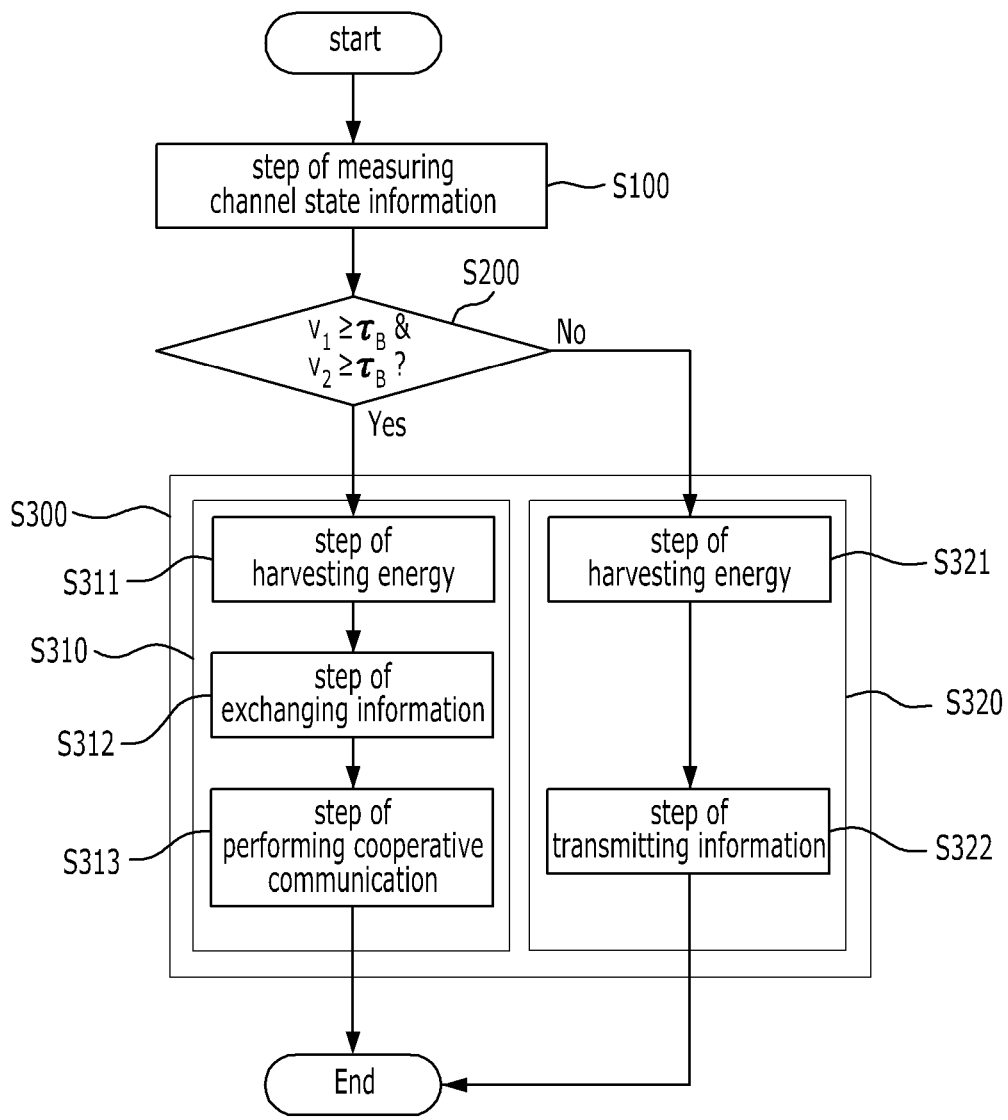

[FIG. 5]
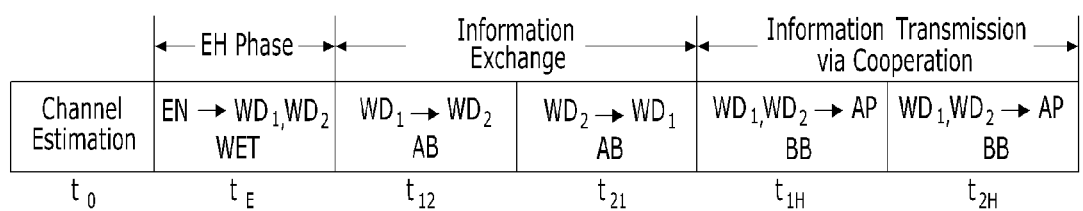

SYSTEM AND METHOD FOR BACKSCATTER-BASED COOPERATIVE COMMUNICATION IN WIRELESS-POWERED HETEROGENEOUS NETWORK

CROSS-REFERENCE TO RELATED APPLICATIONS

This application claims the benefit under 35 USC 119(a) of Korean Patent Application No. 10-2018-0148677 filed on Nov. 27, 2018, in the Korean Intellectual Property Office, the entire disclosure of which is incorporated herein by reference for all purposes.

BACKGROUND

1. Field

The present disclosure relates to a system and a method for backscatter-based cooperative communication in a wireless-powered heterogeneous network.

2. Description of the Related Art

A wireless-powered communication network is a communication network that harvests energy by utilizing RF signals distributed in a surrounding of nodes existing in the communication network or transmitted from a dedicated energy source and uses the harvested energy as an energy source for communication.

Harvest-then-transmit (HTT) is a basic technique for supporting the wireless-powered communication network, and ultimately, it was intended to implement a battery-less communication network that may efficiently manage power.

The nodes in the battery-less communication network harvest RF signals of a dedicated energy source and transmit information using only the harvested energy, but in this technique, a "doubly near-far problem" occurs because the RF signal has to undergo double attenuations of energy transfer downlink and information transmission uplink.

Such a problem causes a fatal problem of service area reduction and a trade-off between performance and fairness among the nodes. In order to solve such a problem, various techniques have been proposed, such as a user relay, a backscatter communication, and cooperative communication.

Hereinafter, the related art associated with cooperative communication and a low-power backscatter communication will be described.

First, a system model and a time frame structure of the related art using the cooperative communication are described with reference to FIG. 1. As shown in FIG. 1, a cooperative communication system includes two wireless devices (WDs) such as IoT sensors, one energy node (EN), and an information access point (AP) in a communication network.

After channel measurements between all nodes, the wireless devices receive energy signals from the energy node and harvest the energy. In addition, the two wireless devices exchange information with each other for cooperative communication. Finally, the two wireless devices perform cooperative communication such as space time block code (STBC) or a distributed beamforming (DTB) to the information access point (AP). Based on such a time flow, time allocation is optimized in order to maximize common-throughput in consideration of the fairness between the two wireless devices.

Another system model of the related art using the cooperative communication is shown in FIG. 2. Although the two models in FIGS. 1 and 2 assume the same communication network model, the biggest difference between the two models is a communication technique utilized in the time frame of information exchange. In FIG. 1, the information exchange is performed using an active RF communication technique, while in FIG. 2, short-range low-power ambient backscatter (AB) communication is used.

The reason is that the WDs such as IoT sensors are densely deployed and arranged at close distances, so short-range communication is sufficient for information exchange, and there is no need to exchange much information because the amount of information collected by the IoT sensors is small.

Further, energy to be used when performing the cooperative communication via simultaneous wireless information and power transmission (SWIPT) power-splitting (PS) circuits may be additionally harvested at the same time of performing transmission and reception of backscatter. Energy efficiency of cooperative communication may be improved by reusing the additionally harvested energy.

Since the backscatter communication supports low-rate transmission, it is mainly used as a secondary access as shown in the above technique. Another conventional technique that solves the service area reduction by a role as described above is hybrid backscatter communication.

Such a technique is dual-mode communication in which the active RF communication is used as a primary access and backscatter communications are used as a secondary access in order to solve the problem of the service area reduction of the harvest-then-transmit and to ensure a uniform distribution of a transmission rate of the backscatter communication depending on the ambient signals.

The IoT devices using the hybrid backscatter communication may perform the backscatter communication and self-powering with the help of base stations of various sizes existing in a communication network, and such a communication network is defined as a wireless-powered heterogeneous network (WPHetNet).

IoT devices in a service area of a high-power base station (i.e., a macro cell, a hybrid access point) may transmit information to a gateway located at a long distance via multi-hop relays using an ambient backscatter communication, and devices in a service area of a low-power access point (i.e., a small cell, a Wi-Fi node) may transmit information to the gateway located at the long-distance via long-range bistatic backscatter communication, thereby smoothly support nodes located in a shadow area.

The "doubly near-far problem" of the harvest-then-transmit may be solved to some degree via the cooperative communication, but since the cooperative communication techniques of FIGS. 1 and 2 described above transmit the information to the access point based on the active RF communication requiring high-power consumption, it is difficult to completely overcome the service area reduction problem.

In other words, the active RF communication-based communication technique that requires a large amount of power consumption makes it difficult to implement a self-powering communication network that allows low-power sensor nodes to operate without a battery.

Since a backscatter communication-based dual-mode operation is a technique for information transmission of a single device, there is a limit to fully supporting the IoT sensor communication network having a dense distribution, and therefore, there is an additional need for a technique to support a plurality of devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a system for backscatter-based cooperative communication in a wireless-powered heterogeneous network includes a low-power access point, a hybrid access point, and Internet of Things (IoT) devices. The low-power access point transmits an unmodulated carrier. The hybrid access point is in communication with a primary device using a signal. Internet of Things (IoT) devices harvest energy of the unmodulated carrier and the signal, and each of the IoT devices sequentially transmits information to the hybrid access point through a bistatic backscatter communication-based cooperation mode or non-cooperation mode using the harvested energy.

The IoT devices may transmit the information in the cooperation mode when the IoT devices satisfy: $v_i \geq \tau_B$, $i \in \{1,2\}$, wherein $v_i$ is a received SNR at a device i, and $\tau_B$ is a threshold value for decoding backscattered signal.

The IoT devices may use a short-range ambient backscatter communication using a primary signal of the hybrid access point and a long-range bistatic backscatter communication using the unmodulated carrier of the low-power access point, respectively.

In another general aspect, a method for backscatter-based cooperative communication in a wireless-powered heterogeneous network, includes measuring, by Internet of Things (IoT) devices, channel state information between the IoT devices, a low-power access point transmitting an unmodulated carrier, and a hybrid access point in communication with a primary device by transmitting a pilot signal; determining, by the IoT devices, whether an ambient backscatter signal, which is an information exchange signal, is decoded; and depending on a result of the determining whether the ambient backscatter signal is decoded, transmitting, by the IoT devices, information to the hybrid access point in a cooperation mode or a non-cooperation mode.

In the determining whether the ambient backscatter signal is decoded, the IoT devices may perform an information exchange through an ambient backscatter communication and determine whether the information exchange is performed using a signal-to-noise ratio (SNR) calculated by using the channel state information.

The IoT devices may transmit the information in the cooperation mode when the IoT devices satisfy: $v_i \geq \tau_B$, $i \in \{1,2\}$, wherein $v_i$ is a received SNR at a device i, and $\tau_B$ is a threshold value for signal decoding.

The transmitting of information to the hybrid access point in the cooperation mode may include harvesting, by the IoT devices, energy for performing information exchange and cooperative communication utilizing a dual-band energy harvesting technology; exchanging, by the IoT device, mutual information to be transmitted to the hybrid access point through ambient backscatter to perform the cooperative communication; and performing, by the IoT devices, the cooperative communication based on a long-range bistatic backscatter communication using the unmodulated carrier transmitted by the low-power access point.

The transmitting of information to the hybrid access point in the non-cooperation mode may include: harvesting, by the IoT devices, energy for operating a backscatter communication circuit utilizing a dual-band energy harvesting technology; and transmitting, by the IoT devices, information of the IoT devices to the hybrid access point through the bistatic backscatter communication using the unmodulated carrier of the low-power access point.

In another general aspect, a system for backscatter-based cooperative communication in a wireless-powered heterogeneous network, includes a low-power access point transmitting a first signal, a hybrid access point in transmitting a second signal, and Internet of Things (IoT) devices. The IoT devices harvest energy of the first signal and the second signal, and transmit information to the hybrid access point through a bistatic backscatter communication-based cooperation mode or non-cooperation mode using the harvested energy.

The first signal may be an unmodulated carrier signal and the second signal may be a modulated information signal.

The IoT devices may transmit the information in the cooperation mode when the IoT devices satisfy: $v_i \geq \tau_B$, $i \in \{1,2\}$, wherein $v_i$ is a received SNR at a device i, and $\tau_B$ is a threshold value for decoding backscattered signal.

The IoT devices may communicate with each other using an ambient backscatter communication, and may communicate with the hybrid access point using a bistatic backscatter communication, respectively.

Other features and aspects will be apparent from the following detailed description, the drawings, and the claims.

BRIEF DESCRIPTION OF THE DRAWINGS

FIG. 1 shows a system and a time frame structure of a cooperative communication-based wireless-powered communication network (WPCN).

FIG. 2 shows a system and a time frame structure of a cooperative communication-based wireless-powered communication network (WPCN) with the help of backscatter.

FIG. 3 shows an example of a configuration diagram for a backscatter-based cooperative communication system in a wireless-powered heterogeneous network.

FIG. 4 shows a flowchart of an example of a method for a backscatter-based cooperative communication in a wireless-powered heterogeneous network.

FIG. 5 shows a time frame structure of an example of a backscatter-based cooperative communication system in a wireless-powered heterogeneous network.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Throughout the specification and claims, when any part includes any component, it means that it may further include another component, except to exclude another component unless specifically stated otherwise.

The present disclosure relates to a system and a method for backscatter-based cooperative communication in a wireless-powered heterogeneous network that may finally establish a battery-less Internet of Things (IoT) sensor communication network having a large-scale dense distribution by solving a service area reduction problem based on short-range ambient backscatter (AB) and long-range bistatic backscatter (BB) communications and via cooperative communication supporting the wireless-powered heterogeneous network (WPHetNet).

The system and the method for backscatter-based cooperative communication in a wireless-powered heterogeneous network according to the present disclosure are the cooperative communication technique based on the low-power backscatter communication, which is the secondary access. More specifically, the energy efficiency may be increased as compared to the related art by using the low-power communication, the service area may be increased by using the long-range bistatic backscatter communication, and the fairness problem between the nodes may be alleviated.

In addition, the system and the method for backscatter-based cooperative communication in a wireless-powered heterogeneous network according to the present disclosure may expand the conventional dual mode backscatter communication that supports only the transmission of the single device to a technique that supports multiple devices by using the backscatter communication.

In addition, the system and the method for backscatter-based cooperative communication in a wireless-powered heterogeneous network according to the present disclosure may be applied to a body area network (BAN) in which an energy charging method is limited or Internet of Things (IoT) and wireless sensor networks which are difficult to handle power management and have large amount of management cost due to the dense deployment of devices when the service area is expanded through the present disclosure.

In addition, the system and the method for backscatter-based cooperative communication in a wireless-powered heterogeneous network according to the present disclosure may more efficiently operate and manage smart homes and smart factories when being applied to the smart homes and the smart factories, which are recently gaining interests, may utilize various types of access points within already installed communication networks because of assuming the heterogeneous communication network, and may be applied to a wide area wireless communication network environment.

FIG. 3 is an example of a configuration diagram for a backscatter-based cooperative communication system in a wireless-powered heterogeneous network.

As shown in FIG. 3, a backscatter-based cooperative communication system in a wireless-powered heterogeneous network according to the present disclosure may include one hybrid access point 200, a low-power access point 100, and two wireless IoT devices 300a and 300b in a communication network. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

In this example, the hybrid access point 200 communicates with a primary device and transmits information transmitted from the wireless IoT devices 300a and 300b to an external server or a personal portable terminal through the communication.

The low-power access point 100 may continuously transmit an unmodulated carrier required for the wireless IoT devices 300a and 300b for a cooperative communication.

The wireless IoT devices 300a and 300b may be configured to perform cooperative communication to the hybrid access point 200 through long-range bistatic backscatter communication using the unmodulated carrier.

In this example, the wireless IoT devices 300a and 300b are configured to perform the cooperative communication by performing self-powering by harvesting RF signals of the hybrid access point 200 and the low-power access point 100 surroundings thereof without a separate power source.

Hereinafter, an organic connection relationship and a signal transmission/reception relationship between the hybrid access point 200, the low-power access point 100, and the two wireless IoT devices 300a and 300b will be described in detail with reference to the drawings.

The IoT devices 300a and 300b may exist in a service area of the low-power access point 100 that exists in a service area of the hybrid access point 200, as shown in FIG. 3.

Therefore, the IoT devices 300a and 300b may use a short-range ambient backscatter communication using the primary signal of the hybrid access point 200 and a long-range bistatic backscatter communication using the unmodulated carrier of the low-power access point 100, respectively.

In addition, the IoT devices 300a and 300b may sequentially transmit information to the hybrid access point 200 via bistatic backscatter communication-based cooperative communication.

Since one of the objects of the present disclosure is to implement a battery-less communication network, the IoT devices 300a and 300b may harvest the energy by performing the self-powering using the signals of the ambient access points without additional power source, and in this example, the IoT devices 300a and 300b perform the cooperative communication using only the harvested energy.

As another example, a method for backscatter-based cooperative communication in a wireless-powered heterogeneous network according to the present disclosure will be described in detail with reference to FIGS. 4 and 5.

For reference, FIG. 4 shows a flowchart of an example of a method for backscatter-based cooperative communication in a wireless-powered heterogeneous network and FIG. 5 shows a time frame structure of an example of a system for backscatter-based cooperative communication in a wireless-powered heterogeneous network.

First, the IoT devices 300a and 300b perform an operation (S100) of measuring the channel state information between the devices and the access point by transmitting a pilot signal.

Thereafter, the IoT devices 300a and 300b perform an operation (S200) of determining whether mutual information exchange for cooperative communication may be performed.

The information exchange is performed through an ambient backscatter communication, and whether the information exchange may be performed in S200 is determined based on a signal-to-noise ratio (SNR) calculated by utilizing the channel state information measured in S100.

That is, a condition that the IoT devices 300a and 300b may decode an ambient backscatter signal used for information exchange is expressed as an equation as follows.

$$v_i \geq \tau_B, \ i \in \{1,2\} \quad \text{[Equation 1]}$$

For reference, in Equation 1, $v_i$ is a received SNR at a device i, and $\tau_B$ is a threshold value for signal decoding.

If Equation 1 is satisfied by the two IoT devices 300a and 300b, the IoT devices 300a and 300b may decode the ambient backscatter signal used for information exchange to perform the information exchange with each other, thereby performing cooperative communication.

Therefore, depending on the determining of whether the information exchange may be performed in S200, the IoT devices 300a and 300b define a case in which the information exchange may be performed, as a cooperation mode.

On the contrary, if Equation 1 is not satisfied even with one of the IoT devices 300a and 300b, the IoT devices 300a and 300b may not perform the cooperative communication because the information exchange may not be performed between the IoT devices 300a and 300b. Such a communication mode is defined as a non-cooperation mode.

The cooperation mode and the non-cooperation mode, defined as described above, operate as described later.

Finally, the IoT devices 300a and 300b perform an operation of transmitting information to the hybrid access point 200 in the cooperation mode or the non-cooperation mode, defined as described above, depending on whether the mutual information exchange for cooperative communication may be performed in S200 (S300).

In the cooperation mode, the IoT devices 300a and 300b sequentially transmit information of each device to the hybrid access point 200 through backscatter-based cooperative communication. First, an operation (S310) of transmitting, by the IoT devices 300a and 300b, the information to the hybrid access point 200 in the cooperation mode is a self-powering operation and performs an operation (S311) of harvesting, by battery-less wireless devices, energy for performing information exchange and cooperative communication.

In this example, since the IoT devices 300a and 300b may receive both types of signals from the hybrid access point 200 and the low-power access point 100, the IoT devices 300a and 300b harvest the energy through a dual-band energy harvest technology and increase communication efficiency.

The IoT devices 300a and 300b perform an operation (S312) of exchanging mutual information to be transmitted to the hybrid access point 200 through ambient backscatter to perform cooperative communication, after harvesting the energy enough to operate a backscatter circuit.

Next, the wireless IoT devices 300a and 300b perform an operation (S313) of performing cooperative communication through a long-range bistatic backscatter communication using the unmodulated carrier transmitted by the low-power access point 100.

In this example, usable cooperative communications are space-time block code (STBC) and a distributed beamforming (DTB). If the channel state information between the IoT devices 300a and 300b and the hybrid access point 200 may be smoothly measured and utilized, the information from each of the IoT devices 300a and 300b is sequentially transmitted using distributed beamforming; otherwise, the information from each of the IoT devices 300a and 300b is sequentially transmitted using space-time block code.

Based on the above, the time frame structure in FIG. 5 may be optimized in consideration of the fairness of throughput of each IoT device. To this end, a common-throughput maximization problem may be formulated. In this case, throughputs of the two IoT devices 300a and 300b may be defined as $R_1(t) = \min\{R_{12}(t), R_{1H}(t)\}$ and $R_2(t) = \min\{R_{21}(t), R_{2H}(t)\}$, respectively. $R_{ij}(t)$ is the throughput between nodes $i,j \in \{1, 2, H\}$, and H is the hybrid access point 200. Finally, an optimization problem may be defined as follows.

$$\max_{\tau} \ R(t) = \min\{R_1(t), R_2(t)\} \quad \text{[Equation 2]}$$
$$\text{s.t.} \ t_0 + t_E + t_{12} + t_{21} + t_{1H} + t_{2H} \leq 1$$
$$t_0, t_E, t_{12}, t_{21}, t_{1H}, t_{2H} \geq 0$$
$$E_i(t) \geq \tau_E, \ i \in \{1, 2\}$$

In Equation 2, $t = [t_0, t_E, t_{12}, t_{21}, t_{1H}, t_{2H}]$ is a time vector and $E_i(t)$ is a total amount of energy harvested by a node $i \in \{1, 2\}$. Constraints include time constraints related to time and energy constraints (energy causality) for operating a backscatter transceiver circuit. The defined common-throughput maximization problem may calculate an optimal time allocation through convex optimization.

If even one wireless device among the IoT devices 300a and 300b has a received SNR ($v_i$), which does not exceed a predetermined threshold value, the backscattered signal may not be decoded even when the ambient backscatter communication is operated.

Therefore, the IoT devices 300a and 300b may not perform the mutual information exchange for cooperative communication. In this case, the IoT devices 300a and 300b have no choice but to transmit their information to the hybrid access point in the non-cooperation mode.

Also, in the non-cooperation mode, the IoT devices 300a and 300b sequentially transmit information of each device to the hybrid access point 200 through backscatter-based cooperative communication. First, an operation (S320) of transmitting, by the IoT devices 300a and 300b, the information to the hybrid access point 200 in the non-cooperation mode performs an operation (S321) of harvesting energy for operating the backscatter communication circuit utilizing a dual-band energy harvesting technology like in the cooperation mode.

Thereafter, the IoT devices 300a and 300b perform an operation (S322) of transmitting information of the IoT devices 300a and 300b to the hybrid access point 200 through the bistatic backscatter communication using the unmodulated carrier of the low-power access point 100.

Based on the above, a common-throughput performance maximization problem may be formed in consideration of the fairness of the wireless devices. A problem form may be formulated similarly to the cooperation mode and has the same energy constraint and time constraint. In the formulated problem, it is possible to calculate the optimal time allocation considering the fairness between the devices through the optimization in the same way as in the cooperation mode.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A system for backscatter-based cooperative communication in a wireless-powered heterogeneous network, the system comprising:
   a low-power access point transmitting an unmodulated carrier;
   a hybrid access point in communication with a primary device using a signal; and
   Internet of Things (IoT) devices harvesting energy of the unmodulated carrier and the signal, and each of the IoT devices sequentially transmitting information to the hybrid access point through a bistatic backscatter communication-based cooperation mode or non-cooperation mode using the harvested energy.

2. The system of claim 1, wherein the IoT devices transmit the information in the cooperation mode when the IoT devices satisfy:

$v_i \geq \tau_B, i \in \{1,2\}$ wherein $v_i$ is a received SNR at a device i, and
   $\tau_B$ is a threshold value for decoding backscattered signal.

3. The system of claim 2, wherein the IoT devices use a short-range ambient backscatter communication using a primary signal of the hybrid access point and a long-range bistatic backscatter communication using the unmodulated carrier of the low-power access point, respectively.

4. A method for backscatter-based cooperative communication in a wireless-powered heterogeneous network, the method comprising:
   measuring, by Internet of Things (IoT) devices, channel state information between the IoT devices, a low-power access point transmitting an unmodulated carrier, and a hybrid access point in communication with a primary device by transmitting a pilot signal;
   determining, by the IoT devices, whether an ambient backscatter signal, which is an information exchange signal, is decoded; and
   depending on a result of the determining whether the ambient backscatter signal is decoded, transmitting, by the IoT devices, information to the hybrid access point in a cooperation mode or a non-cooperation mode.

5. The method of claim 4, wherein in the determining whether the ambient backscatter signal is decoded, the IoT devices perform an information exchange through an ambient backscatter communication and determine whether the information exchange is performed using a signal-to-noise ratio (SNR) calculated by using the channel state information.

6. The method of claim 5, wherein the IoT devices transmit the information in the cooperation mode when the IoT devices satisfy:

$v_i \geq \tau_B, i \in \{1,2\}$, wherein $v_i$ is a received SNR at a device i, and
   $\tau_B$ is a threshold value for signal decoding.

7. The method of claim 6, wherein the transmitting of information to the hybrid access point in the cooperation mode includes:
   harvesting, by the IoT devices, energy for performing information exchange and cooperative communication utilizing a dual-band energy harvesting technology;
   exchanging, by the IoT device, mutual information to be transmitted to the hybrid access point through ambient backscatter to perform the cooperative communication; and
   performing, by the IoT devices, the cooperative communication based on a long-range bistatic backscatter communication using the unmodulated carrier transmitted by the low-power access point.

8. The method of claim 7, wherein the transmitting of information to the hybrid access point in the non-cooperation mode includes:
   harvesting, by the IoT devices, energy for operating a backscatter communication circuit utilizing a dual-band energy harvesting technology; and
   transmitting, by the IoT devices, information of the IoT devices to the hybrid access point through the bistatic backscatter communication using the unmodulated carrier of the low-power access point.

9. A system for backscatter-based cooperative communication in a wireless-powered heterogeneous network, the system comprising:
- a low-power access point transmitting a first signal;
- a hybrid access point in transmitting a second signal; and
- Internet of Things (IoT) devices harvesting energy of both the first and the second signals, and transmitting information to the hybrid access point through a bistatic backscatter communication-based cooperation mode or non-cooperation mode using the harvested energy.

10. The system of claim 9, wherein the first signal is an unmodulated carrier signal and the second signal is a modulated information signal.

11. The system of claim 9, wherein the IoT devices transmit the information in the cooperation mode when the IoT devices satisfy:

$$v_i \geq \tau_B, \ i \in \{1,2\},$$

wherein $v_i$ is a received SNR at a device i, and
$\tau_B$ is a threshold value for decoding backscattered signal.

12. The system of claim 9, wherein the IoT devices communicate with each other using an ambient backscatter communication, and communicate with the hybrid access point using a bistatic backscatter communication, respectively.

* * * * *